Feb. 10, 1959 A. R. VOGEL 2,872,838
CONTROLLABLY EXPANDABLE AND REMOVABLE FASTENER
Filed May 24, 1954 2 Sheets-Sheet 1
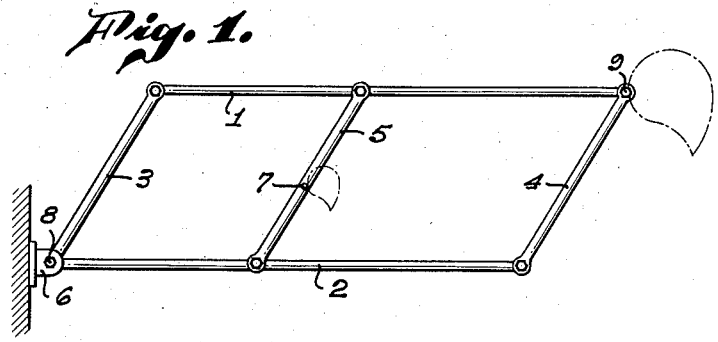
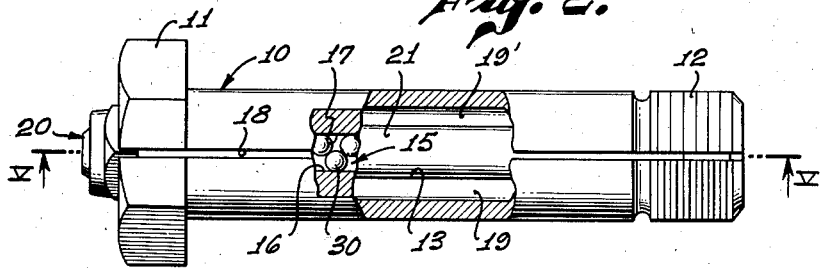
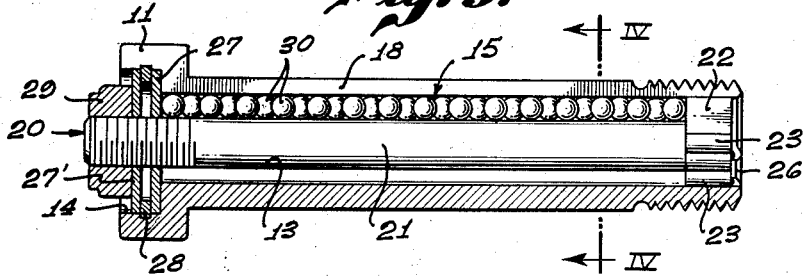
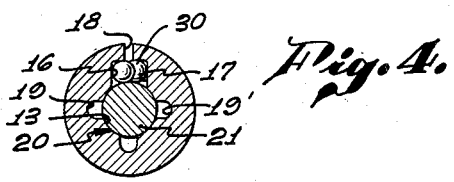
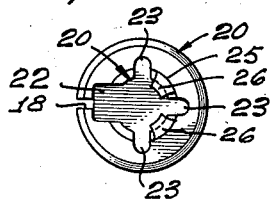
ALVIN R. VOGEL,
INVENTOR.
BY
ATTORNEY.

Feb. 10, 1959
A. R. VOGEL
2,872,838
CONTROLLABLY EXPANDABLE AND REMOVABLE FASTENER
Filed May 24, 1954
2 Sheets-Sheet 2
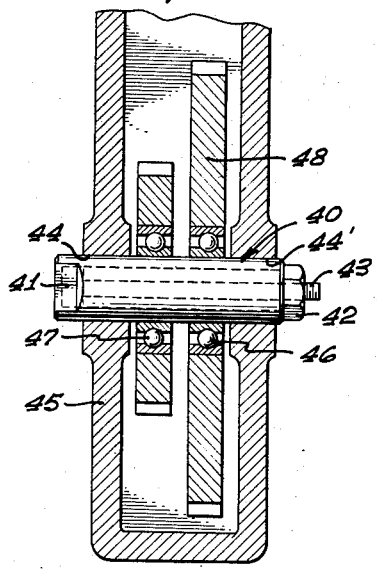
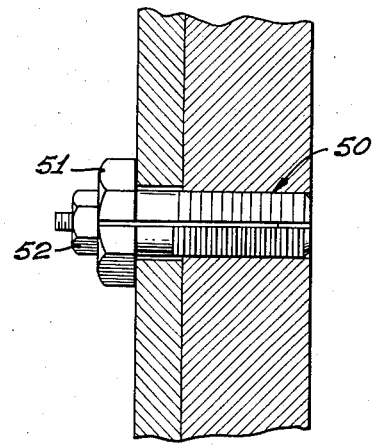
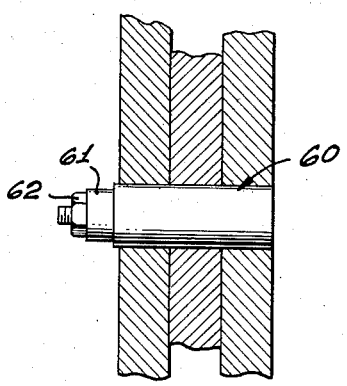
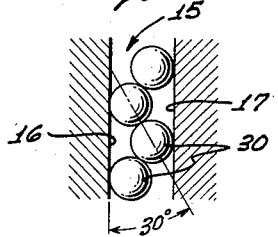
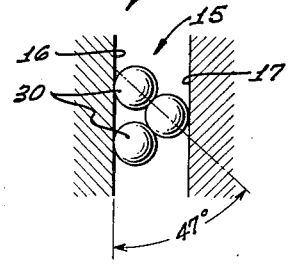
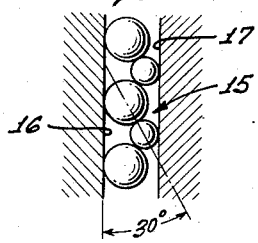
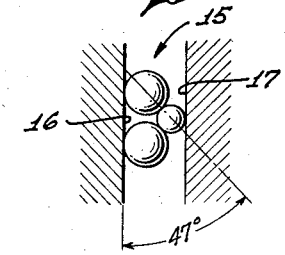
ALVIN R. VOGEL,
INVENTOR.
BY
ATTORNEY.

United States Patent Office 2,872,838
Patented Feb. 10, 1959

2,872,838

CONTROLLABLY EXPANDABLE AND REMOVABLE FASTENER

Alvin R. Vogel, Los Angeles, Calif.

Application May 24, 1954, Serial No. 431,631

15 Claims. (Cl. 85—2)

This invention relates to a fastening device, locking device, and precision hinge or clevis pin adapted for use in a great variety of conditions, tools, instruments, servomechanisms, and machines encountered and employed in diverse industries. The term fastening device as used herein includes bolts, clevis pins, stud bolts, screws, headed and headless bolts, hinge pins, replaceable rivets and the like, the construction and method of operation disclosed herein being applicable to all of these previous forms of devices as well as to others.

In a great variety of tools and equipment, parts or elements are connected together by various types of fastening devices. When the entire machine or tool must be made with accuracy to small tolerances on the order of 0.001 or 0.0005, it is generally impossible to use drilled holes since drilled holes cannot be formed to desired limits. Precision sizing of holes is not readily controlled or accomplished by individually operated tools such as reamers and, therefore, necessitates a machine shop operation with suitable support fixtures, alignment equipment, grinders, etc. Precision sizing of the holes to precise machine tolerances with small minimum clearance allowance for installation results in high manufacturing costs and a great deal of handling of the various parts which are to be inter-connected. In the case of hinge joints involving precision bearings, the bolt tolerance must satisfy a proper fit to the bearing inner race or to the clevis or fittings, and since these are independently produced, the tolerances are rarely identical and in most instances show sufficient deviation so as to preclude the production of a hinge joint which is free from backlash. In many instances it is absolutely impossible to assemble the various parts which are to be connected by a hinge pin and grind all of the aligned bores to a uniform and desired size. In many instances, as in the machine tool industry, rigid, backlash-free joints are mandatory in order to produce accurate work by the finished machine. It is to be remembered that any joint subjected to load reversals generates dynamic oscillation if backlash is present, such oscillation causing the bores or holes to enlarge and in turn increase the amplitude of oscillation, this ultimately leading to destruction of the equipment or the machine involved and lack of accuracy prior to such destruction. The control and response characteristics of assemblies including linkages and joints which are loose or involve lost motion, are greatly impaired.

As previously stated, conventional methods of correcting this situation lead to minimizing or reducing free play rather than completely eliminating this undesirable characteristic, due to the expense involved in attempting to hone inter-related elements in jigs or in place. There is a great need for a bolt or other fastening device capable of insuring absolute zero radial backlash in any joint, particularly those subject to load reversals.

The present invention relates to a fastening device capable of expanding radially in a non-linear and controlled manner so as to satisfy the demands of the bores of individual but adjacent members which are to be connected by the fastening device. The fastening device of the present invention is capable of controllably expanding radially so as to properly fit two, three or more aligned bores, even though they vary in their internal diameters, so as to produce either a backlash-free joint or in some cases to lock the various elements securely together without any back play. In addition, the fastening device of the present invention is readily capable of returning to its original installation diameter when the force compelling radial expansion is removed. The fastening device hereinafter disclosed in detail is therefore capable of being used in holes that are produced to conventional drilling tolerances and eliminates the necessity of using ground, reamed, honed or burnished tolerances.

Generally stated, therefore, the invention relates to a fastening device comprising a body having an axial bore, a pin positioned in such bore, and a recess within the body, such recess communicating with a longitudinal slit formed in the body. A pressure distributing means is carried within the recess, the head of the pin exerting a desired and controlled pressure upon the pressure distributing means so as to cause the body to expand radially. The radial expansion is non-linear and the body adapts itself at desired longitudinally spaced zones to the internal diameters of the holes of adjacent parts being connected by the fastening device.

An object of the present invention, therefore, is to disclose and provide a new and improved type of fastening device, said device being capable of differential expansion along its length in accordance with the size of bores into which the device is inserted, whereby two or more elements having bores differing in size can be connected with uniform tight fit between the fastening device and all such elements.

Another object is to disclose and provide a fastening device employing a longitudinally slit body, mobile but not compressible pressure-distributing means within the body and means for controllably applying pressure to said means whereby desired radial expansion of the body is obtained.

A further object is to disclose and provide a readily manufactured, simple and foolproof fastening means capable of non-linear and non-uniform radial expansion, whereby joints free from backlash and free play can be attained between elements without the necessity of pre-sizing and honing the bores of such joints to identical size or fine tolerances.

A still further object is to disclose methods and means of utilizing ball bearings in fastening devices such as bolts, pins, rivets and the like.

These and other objects, modifications and adaptations, uses and characteristics of the invention will become readily apparent from a description of certain forms described hereinafter and illustrated in the appended drawings, in which:

Fig. 1 is a somewhat diagrammatic representation of a piece of machinery employing fastening devices of this invention.

Fig. 2 is a side elevation of a fastening device, partly broken away.

Fig. 3 is an end view thereof.

Fig. 4 is a transverse section taken along the plane IV—IV in Fig. 5.

Fig. 5 is a longitudinal section taken along the plane V—V in Fig. 2.

Fig. 6 is a section, partly in elevation, of a gear assembly employing a fastening device of the present invention.

Fig. 7 is an end view thereof.

Fig. 8 illustrates a screw embodying the construction of this invention.

Fig. 9 illustrates a headless shear rivet constructed in accordance with this invention.

Fig. 10 is an enlarged diagrammatic representation of ball bearings within a recess, the device being in relaxed position.

Fig. 11 illustrates the position of the balls in expanded position.

Figs. 12 and 13 diagrammatically illustrate the position of the balls of unequal diameter in the recess of a fastening device, Fig. 12 showing the device in relaxed and Fig. 13 in expanded position.

The desirability and virtual necessity of providing joints having zero backlash in various machines will be appreciated by reference to Fig. 1, which diagrammatically illustrates a contour milling machine. The mechanism comprises a pantograph (composed of links 1, 2, 3, 4 and 5) pivotally connected to a firmly mounted, stationary hinge bracket 6. A side milling cutter 7 (powered by a suitable motor) is carried by link 5 at a point in a line drawn from the center of hinge pin 8 and pin 9 joining the links 1 and 4. Pin 9 carries a precision bearing roller or tracer which cooperates with and bears against a model or template; the cutter 7 duplicates contours on the work. A large model is here shown, this increasing the accuracy of the process.

It will be evident that the direction of load in the various joints changes with corresponding change in position of the roller carried by pin 9. In order to insure accuracy of reproduction, backlash or play must be eliminated from all of the joints between links and between the mechanism and its bracket. In order to attain such minimum or zero backlash, all of the pivot pins or bolts at such joints should be of the ball-bearing, expanding type hereafter described in detail. The use of fastening devices of the present invention results in longer life and improved performance of machines using toggle joint linkages (where small backlash results in high dynamic loads, alters travel and displacement and affects precise operation), multicolor printing presses, forges, contour and spar milling machines, injection molding machines, servomechanisms, etc.

The headed bolt illustrated in Figs. 2 to 5, inclusive, and embodying the construction forming the subject matter of this invention, comprises a cylindrical body 10 provided with an enlarged head 11 at one end, the head being of suitable polygonal external configuration, the opposite end of the bolt being threaded as indicated at 12. The body 10 is provided with a through bore 13, the head being counterbored as indicated at 14.

A recess, generally referred to by the numeral 15 and having parallel, longitudinally extending walls 16 and 17, is formed in the body 10, said recess being in communication with the bore 13. The body 10 is also provided with a slit 18 communicating with the recess 15. One or more relief grooves, such as the grooves 19 and 19', are formed in the body, these grooves also opening into the bore 13 and extending longitudinally of the body 10. These relief grooves are angularly displaced with respect to the recess 15.

Slidably fitted into the bore 13 is the shank 21 of a pin 20 provided with a formed head having one wing 22 extending into the recess 15 and other wings, such as 23, each extending into a relief groove. It will be evident, therefore, that the pin 20, together with its head, may be slidably received within the body 10 of the fastening device. The end of the body 10 may be provided with a V groove 25 so that after the pin has been inserted into the bore, portions of metal of the body 10 may be swaged or peened down as indicated at 26, in order to prevent the head pin 20 from accidentally falling out of the body of the bolt in the relaxed position if the adjustment nut is deliberately removed.

After the headed pin 20 is placed within the bore of the body, the recess 15 is filled with a mobile, noncompressible, pressure-distributing means. Materials which will exhibit plastic flow or permanent deformation under the stresses encountered in actual practice are not suitable for distributing pressure. Steel shot or preferably ball bearings have been found to be eminently suited for use as pressure and force-distributing means in the recess. Balls 30 of the same diameter can be used or the diameters can vary. When balls of equal diameter are employed such diameter is correlated to the width of the recess in order to insure effective distribution of forces and ordinarily the recess has a width of between about 1.4 and 1.7 times the diameter of the balls. It is desirable to correlate the width of the recess and ball diameter so as to have the balls, in compacted relation, assume positions wherein lines connecting the centers of adjacent balls lie at angles of between about 30° or 35° and 45° or 50° with the longitudinal axis of the recess or its walls, through the entire effective radial expansion range of the fastening device.

The balls 30 contained in the recess 15 bear against the wing 22 of the head of pin 20. They are retained in the recess by means of a washer 27 positioned in the counterbored portion 14 of the head 11. Washer 27 serves to resist the longitudinal or axial force of the column of steel balls exerted by the pressure applied from the head of pin 20 at the opposite end. Washer 27 may be prevented from accidental loss by means of a snap ring 28 which is held within the counterbore by interengagement with a groove cut in the wall of counterbore 14. Means are provided for applying a controllable force to the balls 30 by means of a nut 29 carried by the threaded end of pin 20, an auxiliary washer 27' being interposed between the nut and the snap ring 28. Controllable force may be readily obtained with assured repeatability by specifying a torque wrench to be applied to the nut. This nut will be a standard self-locking type which retains its position and setting even under vibration.

It will be evident that the body 10 of this fastening device may be inserted into a bore or into aligned bores of a number of elements which it is desired to connect. Thereafter by proper adjustment of nut 29, force can be applied to the balls 30 and since these balls are mobile and movable laterally, longitudinally and radially in the recess, they will distribute the force and apply pressure to the walls 16 and 17 of the recess 15, causing the body of the bolt to expand radially. This expansion will be non-linear, i. e., it may be different in different longitudinal sections of the body 10 in accordance with the resistance encountered. As a result, a wing bolt may be caused to snugly fit two or three aligned and adjacent bores of elements being connected together and properly fit without backlash or free play in each of such bores.

Figs. 10 and 11 diagrammatically illustrate relaxed and expanded positions of a fastening device recess containing balls of equal diameter. Figs. 12 and 13 diagrammatically illustrate relaxed and expanded positions of a fastening device recess containing one exemplary arrangement of large and small ball bearings in alternate relation.

It may be noted that the recess 15 and relief groove or grooves 19 are preferably formed by a through draw broach while the body 10 is in its soft state, the recess and grooves extending from end to end of the body. Continuity and uniformity of cross-section so attained results in economies in manufacture (which are not attained if the recess and/or grooves terminate within the body) and, moreover, the response characteristics of the body are rendered more uniform. The width of the recess should normally not exceed about 0.8 of the diameter of the bore or pin; in practice, a width of 0.5 to 0.75 of the diameter of the pin has been found effective.

The walls 16 and 17 of the recess may be said to constitute a ball race of zero curvature, and hardness, finish, and other factors taken into consideration in the design and manufacture of races for ball bearings are applicable here to the manufacture of the recess. After broaching, the body 10 is suitably heat-treated to an ultimate strength of over 150,000 p. s. i. and usually about 180,000 p. s. i. When ball bearings (normally having a hardness of Rockwell C 64) are used in the recess, the body 10 and walls 16—17 of the recess are desirably heat-treated to a hardness on the order of Rockwell C 40.

Attention of those skilled in the art is called to the fact that the present invention is the first which correlates the various design factors and physical characteristics of materials employed so as to produce a fastening device expansible radially over its entire length in non-linear fashion and which operates within the proportional limit range of stress-strain curve, thereby permitting the body to return to its original external diameter when the expansive pressure is released.

Since the head of the pin slidably fits the recess and relief grooves, dirt or other material is prevented from entering the body through the end of the bolt during shipment, storage, etc. Some foreign material could, however, enter through the slit 18. In order to obviate such contamination and prevent loss of ball bearings, the interstices between balls 30 can be filled with pasty or semisolid resilient or readily deformable or plastic elastomer which is stable over a wide range of temperatures (say, —65° F. to 250° F.). Silicones, organo-silicon polymers, siloxane compounds, alkyl, silicone resins, either alone or containing finely divided fillers, plasticized polyester gums, synthetic rubber compounds, polyethylene waxy compounds, and the like, may be used, the balls being embedded in these materials. Such materials may extend into the slit. They should be readily deformable so as not to interfere with the transmission of force of the balls for radial expansion of the body.

It will be noted that the fastening device of the present invention distinguishes from prior attempts which employed a split sleeve and/or a tapered fit, since such tapered fits did not permit the external split sleeve into which the tapered fit was longitudinally inserted to expand or adjust its outside diameter in a non-linear fashion. These prior split sleeve or tapered fit arrangements were restricted in their use in a single member only, as in the case of an arbor. Prior devices which attempted to use a split cylindrical sleeve of constant or uniform diameter had to be of larger initial diameter than the hole or series of holes in which such device was installed. Such prior devices required special tools for installation and removal. Moreover, such prior devices depended upon the spring rate or force required to radially deflect and the sleeve would expand to fit only the smallest diameter hole in any combination or series joint; there was no adjustable pressure exerting or distributing means to resist a change in diameter with application of load to the joint. In comparison, the fastener of the present invention is slightly smaller in diameter than a standard hole (or series of holes in a joint) and can be easily installed; after installation the fastener conforms to relative hole sizes by reason of radial expansive forces generated by the application of torque to nut 29. Likewise, no special tools are required to remove the bolt or fastener by axial force or pressure; instead, merely unscrewing nut 29 causes the balls to assume their original relative positions, relieves the distending force and permits the body of the fastener to return to its original "relaxed" diameter or position, whereupon the fastener can be readily removed. It may be noted that although the fastening devices of this invention are usually provided with a body having a cylindrical surface, such bodies may be, in special cases, of square, hexagonal or other section. Moreover, the spring rate of the body of the bolt of the present invention is equivalent to the value of elasticity of steel and, therefore, distinguishes from prior devices which employed elastomers, rubber, packing or the like. The fastening device of the present invention approaches the theoretically ideal condition wherein the application or reduction in force always produces an immediate displacement, the device acting entirely upon the slope of the spring rate and being completely controllable at all times. As a result, fastening devices of the present invention are free from backlash or free play.

As previously stated, fastening devices embodying the present invention may assume a great variety of forms and are capable of being employed in many industries, tools, machines, etc. Figs. 6 and 7 illustrate one form of fastening device made in accordance with the present invention, the construction being embodied in a headless expanding pin. In this form of device, the body is a sleeve 40 provided with a through bore and including a recess, a slit and relief grooves as in the case of the bolt illustrated in Figs. 2 to 5. One end of this fastening device is provided with wrench flats 41, 41' and the other carries the adjustment nut 42 threaded upon the end 43 of the headed pin by means of which regulatable pressure may be applied upon the pressure-distributing means (preferably ball bearings) carried within the recess. Such hinge pin or bearing bolt 40 may extend through the bores 44, 44' of a gear case 45 and also engage the inner races of ball bearings 46 and 47 carried by gears and pinions 48. The expanding pin 40 provides the proper fit in the inner races of the bearings, preventing relative rotation and subsequent damage. A press fit between a conventional shaft or bolt and the bearing inner race would damage the bearings on installation, since it is not possible to back up the inner races; all of the press force would have to be resisted directly by the bearing in thrust.

Fig. 8 illustrates a screw constructed in accordance with the present invention. The body 50 may be externally threaded and provided with an inner through bore, a recess for the pressure-distributing medium and one or more relief grooves of the character hereinbefore described. This body may then be longitudinally slit. The body may be provided with a head 51 whereas the end of the internal pin may carry the adjustment nut 52. This screw may be inserted and threaded in normal fashion and then by adjustment of the nut 52 caused to expand and become locked in position.

Fig. 9 illustrates a headless shear rivet made in accordance with the present invention. In this case the body 60 may be cylindrical and may or may not have flats 61 formed at one end. This body again contains a central bore, a recess in communication therewith, a slit in communication with the recess and one or more relief grooves. Fitted into such body is a headed pin, the threaded end of the pin being provided with the adjustment nut 62. Upon being inserted into two or more aligned bores of elements which it is desired to connect, the adjustment nut 62 is rotated to apply pressure upon the pressure-distributing medium, such as ball bearings within the recess, and the rivet expands to lock itself in position within the aligned bores.

Maximum benefits are derived from the use of headed or headless type ball bearing bolts or hinge pins of the character illustrated in Fig. 6, in clevis-type joints, involving high shear loading coupled with the requirement for absolute radial relative freedom of all members of the joint when subjected to oscillating loads, the hinge joint at the bracket in Fig. 1 being one example. It is to be understood that the fastening devices embodying the construction herein disclosed can be made of any metal or alloy but are preferably made of mild steel or the like so as to be interchangeable with existing standard series bolts. The metal employed and the heat treatment imparted thereto must be such that the fastening device will not exhibit undesirable characteristics associated with exceeding yield of material (permanent set), such as creeping under load, whether the latter is due to expansion forces or externally applied loads. The fastening device is unaffected by wide ambient temperatures and is capable of returning to installation diameter when released, thereby permitting ease of removal.

It will be noted that the boring of the body in order to accommodate the pin does not affect the bending strength of the fastening device, although the shear load is slightly reduced. However, the heat treatment results in a fastening device which exceeds both shear and bending strengths of equivalent standard bolts. Moreover, it will be noted that the fastening device is a composite assembly which cannot be inadvertently disassembled into a number of loose parts and no special installation techniques are required.

I claim:

1. A fastening device adapted to expand radially in non-linear fashion comprising: a metallic body provided with an axially extending bore, a longitudinally extending internal recess formed in the body and communicating with the bore, said recess being of smaller width than said bore, a narrow longitudinal slit communicating with the recess, a longitudinally extending relief groove in said body communicating with said bore and angularly displaced with respect to said recess; mobile, pressure-distributing means carried within the recess, and a pin means within said bore, said pin means including a head bearing upon said pressure-distributing means to subject the latter to regulatable pressure and produce radial expansion of said body in accordance with varying diameters of bores of members in which said device is positioned.

2. A device of the character stated in claim 1 wherein the mobile pressure-distributing means comprises a plurality of ball bearings.

3. A device of the character stated in claim 1 wherein the pressure-distributing means comprises ball bearings and the recess has a width of between about 1.4 and 1.7 times the diameter of the ball bearings.

4. A fastening device of the character stated in claim 1, wherein said pressure-distributing means comprise a plurality of ball bearings of smaller diameter than the width of said recess, lines connecting centers of adjoining balls lying at an angle of between about 30° and 50° with the longitudinal axis of the recess.

5. A fastening device of the character stated in claim 1, wherein the body is of hardened metal, and the pressure-distributing means comprise a plurality of ball bearings embedded in an elastomer.

6. A fastening device of the character stated in claim 1, wherein the pin means is threaded at one end and provided with a nut bearing against the body to regulate the pressure upon the pressure-distributing means.

7. A fastening device of the character stated in claim 1, wherein the head of the pin is provided with a fin extending into the relief groove.

8. A fastening device adapted to extend through a plurality of aligned bores in adjacent members and adaped to expand radially in a non-linear fashion to fit said bores when certain of said bores deviate from each other in diameter, comprising: a body provided with an axially extending bore, a longitudinally extending internal recess formed in the body and communicating with the bore, said recess being smaller in width than said bore; a narrow longitudinal slit communicating with the recess; mobile pressure-distributing means filling the recess, said pressure-distributing means being movable laterally, longitudinally and radially in said recess, and a pin means within said bore, said pin means including a head bearing upon said pressure-distributing means to subject the latter to regulatable pressure and produce radial expansion of said body along its entire length in accordance with varying diameters of bores of members in which said device is positioned.

9. A device of the character stated in claim 8 wherein the mobile pressure-distributing means comprises a plurality of ball bearings.

10. A fastening device adapted to extend through a plurality of aligned bores in adjacent members and adapted to expand radially in a non-linear fashion to fit said bores when certain of said bores deviate from each other in diameter, comprising: a body provided with an axially extending bore, a longitudinally extending internal recess formed in the body and communicating with the bore, said recess being smaller in width than said bore; a narrow, longitudinal slit communicating with the recess; mobile pressure-distributing means carried within the recess, said pressure-distributing means being movable laterally, longitudinally and radially in said recess, and regulatable pressure means carried within said bore and operatively cooperating with said pressure-distributing means for subjecting the latter to regulatable pressure and produce radial expansion of said body along its entire length in accordance with varying diameters of bore members in which said device is positioned.

11. A device of the character stated in claim 10 wherein the mobile pressure-distributing means comprises a plurality of metal balls.

12. A fastening device adapted to extend through a plurality of aligned bores in adjacent members and adapted to expand radially in a non-linear fashion to fit said bores when certain of said bores deviate from each other in diameter, comprising: a body provided with axially extending recess and bore means; a single continuous longitudinal slit in said body communicating with said recess and bore means; and regulatable mobile pressure-distributing means filling said recess and movable laterally, longitudinally and radially within said recess and bore means for subjecting said body to regulatable pressure virtually along its entire length and produce radial expansion thereof in accordance with varying diameters of bore members in which said device is positioned.

13. A device of the character stated in claim 12 wherein said mobile pressure-distributing means includes ball bearings.

14. A fastening device adapted to extend through a plurality of aligned bores in adjacent members and adapted to expand radially in a non-linear fashion to fit said bores when certain of said bores deviate from each other in diameter, comprising: a body of hardened metal having a virtually smooth cylindrical external surface slightly smaller in diameter than bores in which said fastener is to be installed, and an axially extending bore; a single continuous longitudinal slit extending from one end to the other end of said body and communicating with said bore; mobile pressure-distributing means movable laterally, longitudinally and radially within said bore and a pin means within said bore, said pin means including a head bearing against said mobile pressure-distributing means to subject the latter to regulatable pressure and produce radial expansion of said body in accordance with varying diameters of bores of members in which said body is positioned.

15. A fastening device adapted to extend through a plurality of aligned bores in adjacent members and adapted to expand radially in a non-linear fashion to fit said bores when certain of said bores deviate from each other in diameter, comprising: a body of hardened metal having a head at one end, external threads carried by the other end and a virtually smooth cylindrical external surface between said head and threads slightly smaller in diameter than bores in which said fastener is to be installed, and an axially extending bore; a single continuous longitudinal slit extending from one end to the other end of said body and communicating with said bore; mobile pressure-distributing means movable laterally, longitudinally and radially within said bore and a pin means within said bore, said pin means including a head bearing against said mobile pressure-distributing means to subject the latter to regulatable pressure and produce radial expansion of said body in accordance with varying diameters of bores of members in which said body is positioned.

(References on following page)

References Cited in the file of this patent

UNITED STATES PATENTS

| | | |
|---|---|---|
| 660,559 | Church | Oct. 30, 1900 |
| 677,373 | Rauhoff | July 2, 1901 |
| 691,921 | Wheeler | Jan. 28, 1902 |
| 806,406 | Farrington | Dec. 5, 1905 |
| 925,006 | Mason | June 15, 1909 |
| 1,340,897 | Kelly | May 25, 1920 |
| 1,548,730 | Mirfield | Aug. 4, 1925 |
| 2,042,850 | Knapp | June 2, 1936 |
| 2,125,617 | Niemann | Aug. 2, 1938 |
| 2,283,975 | Dillon | May 26, 1942 |
| 2,566,573 | Lyon | Sept. 4, 1951 |
| 2,573,498 | Scott | Oct. 30, 1951 |
| 2,709,389 | Kleij | May 31, 1955 |

FOREIGN PATENTS

| | | |
|---|---|---|
| 88,935 | Switzerland | Apr. 1, 1921 |